United States Patent Office 2,892,924
Patented June 30, 1959

2,892,924

ELECTRODE FOR MELTING AND ARC WELDING ZIRCONIUM METAL

Floyd W. Wood, Albany, Oreg., assignor to the United States of America as represented by the Secretary of the Interior No Drawing. Application January 24, 1957
Serial No. 636,213

6 Claims. (Cl. 219—118)

(Granted under Title 35, U.S. Code (1952), sec. 266)

The invention herein described and claimed may be manufactured and used by or for the Government of the United States for governmental purposes without the payment of royalties thereon or therefor (35 U.S.C., sec. 266).

This invention relates to non-consumable electrodes for arc welding and melting zirconium.

Non-consumable electrode electric arc melting and welding techniques are employed in fabricating, melting, and joining together pieces or sections of zirconium metal. The methods employed are discussed fully in "Metallurgy of Zirconium," edited by Lustman and Kerze, published in 1955 by McGraw-Hill Book Co., Inc., in chapters 6 and 7, and "Zirconium" by Miller, published in 1954 by Academic Press, Inc., N.Y., chapters 15 and 16.

The electrode employed in the process may contaminate the zirconium, causing weak joints, poor workability and lowering of corrosion resistance. Particularly troublesome is the use of tungsten electrodes in zirconium scrap recovery. See Miller, supra, page 284. Tungsten contamination is random, but unavoidable and greatly diminishes the usefulness of the recovered metal. I have discovered that electrodes containing zirconium nitride obviate many disadvantages inherent in tungsten electrodes.

It is the broad object of this invention to provide an improved arc welding electrode, and a method employing it for arc welding.

It is a further object to provide an arc welding electrode having a stem of zirconium, with a tip comprising zirconium nitride and zirconium metal.

A further object is to provide an electrode having a stem of zirconium with a tip comprising a mixture of zirconium nitride and zirconium metal, the nitrogen content of the tip portion being from about 5 to about 9 percent.

A further object of the invention is to provide a method for electric arc welding wherein an electric arc is maintained between the work to be welded and an electrode comprising a zirconium stem member and a tip comprising a mixture of zirconium nitride and zirconium.

It is a further object of the invention to provide a method for electric arc welding zirconium metal wherein the electrode is a non-consumable electrode having a zirconium stem with a tip of zirconium metal and zirconium nitride.

Further objects of this invention will become apparent from the rest of the specification and claims.

*Example*

Zirconium nitride was prepared by passing pure nitrogen over heated powdered zirconium at a temperature of 800–1200° C. to give a product analyzing 5 to 9% nitrogen by weight. The resulting powder was further comminuted and then pressed into a cylindrical form roughly three-eighths to one-half inch long and one-half inch in diameter. The mass was then placed in a water-cooled copper crucible atop a stem of zirconium rod of like diameter and about five-eighths inch in length. Using a one-fourth inch diameter electrode of thoriated tungsten, an electric arc was played on the exposed surface, thereby sintering the mass of nitride composition and fusing it to the zirconium stem. After cooling, the stem was machined and threaded for attachment to a welding device, with the small plug of nitrided metal constituting the electrode tip. This electrode could be employed almost indefinitely in the melting and welding of zirconium without introducing any deleterious material to the metal. In use, the limiting current which must not be exceeded is 500 amperes. The experimental data for a test weld is as follows:

| | |
|---|---|
| Electrode diameter | ½ inch. |
| Electrode height | 1 inch (⅝ inch stem). |
| Material joined | Briquetted zirconium turnings 4 inch diam. cylinders of variable height. |
| Power employed | D.C., 30 volts, 250 amperes, electrode was cathode. |
| Welding atmosphere | 20% argon, 80% helium. |
| Time of welding | 35 minutes. |
| Dimension of weld | 2 inches wide, ⅜ inch deep, 75 inches long. |
| Weight of tip before | 18.97 grams. |
| Weight of tip after | 18.92 grams. |
| Analysis of welded metal for electrode material | None detected. |

Although specific percentages are indicated in this example, the invention is not to be understood as limited thereto.

What I claim as my invention is:

1. An electrode for arc welding which comprises a stem of zirconium having integral therewith, and at one end thereof, a tip comprising zirconium nitride and zirconium metal.

2. An electrode for arc welding which comprises, a stem of zirconium, a tip comprising a mixture of zirconium and zirconium nitride, and containing from about 5 to about 9 percent nitrogen, said tip being mounted integrally at one end of said stem.

3. In the method for arc welding zirconium metal employing a non-consumable electrode wherein the electrode serves as the cathode in the process, the improvement which consists in using as the electrode a zirconium stem member having integral therewith, a tip comprising a mixture of zirconium nitride and zirconium.

4. A method as in claim 3 wherein the electrode consists of a zirconium stem member having integral therewith, a tip composed of a mixture comprising zirconium and zirconium nitride having a nitrogen content of from about 5 to about 9 percent.

5. A method for arc welding metals employing a non-consumable electrode, wherein the electrode serves as the cathode in the process, the improvement which consists in using as the electrode a zirconium stem member having integral therewith a tip comprising a mixture of zirconium nitride and zirconium.

6. A method for electric arc welding, which comprises maintaining a welding arc between the work to be welded and an electrode comprising a zirconium stem member having integral therewith a tip comprising a mixture of zirconium nitride and zirconium.

References Cited in the file of this patent

UNITED STATES PATENTS

| | | |
|---|---|---|
| 1,535,365 | Doan | Apr. 28, 1935 |
| 1,990,628 | Andrus | Feb. 12, 1935 |
| 2,000,182 | Lincoln | May 7, 1935 |
| 2,085,431 | Johnson | June 29, 1937 |
| 2,308,700 | Mansfield | Jan. 19, 1943 |
| 2,367,978 | Troy | Jan. 23, 1945 |
| 2,444,422 | Bradford | July 6, 1948 |
| 2,576,793 | Jordan | Nov. 27, 1951 |
| 2,761,047 | Meredith | Jan. 11, 1954 |
| 2,810,818 | Rothschild | Oct. 22, 1957 |
| 2,825,793 | Kee | Mar. 4, 1958 |